United States Patent [19]
Coleman et al.

[11] Patent Number: 5,890,676
[45] Date of Patent: Apr. 6, 1999

[54] AIRSHIP WITH NEUTRAL BUOYANCY FUEL BLADDER

[76] Inventors: Richard Coleman, 1709 Tyvale Ct., Vienna, Va. 22180; Lathan Collins, 42305 Daniel Dr., Lancaster, Calif. 93536

[21] Appl. No.: 976,311

[22] Filed: Nov. 21, 1997

[51] Int. Cl.⁶ .................................................. B64B 1/58
[52] U.S. Cl. ........................... 244/128; 244/61; 244/30; 244/97
[58] Field of Search ................................ 244/128, 30, 97, 244/190, 96, 126, 61

[56] References Cited

U.S. PATENT DOCUMENTS

| | | |
|---|---|---|
| 1,977,392 | 9/1934 | Mackenzie ................................ 244/51 |
| 2,094,619 | 10/1937 | Reichert et al. . |
| 3,456,903 | 7/1969 | Papst . |
| 3,897,032 | 7/1975 | Papst . |
| 4,012,016 | 3/1977 | Davenport . |
| 4,032,085 | 6/1977 | Papst . |
| 4,204,656 | 5/1980 | Seward, III . |
| 4,547,167 | 10/1985 | Bergmann . |
| 4,773,617 | 9/1988 | McCampbell . |
| 5,074,489 | 12/1991 | Gamzon . |
| 5,090,637 | 2/1992 | Haunschild ............................... 244/97 |
| 5,348,254 | 9/1994 | Nakada . |
| 5,503,350 | 4/1996 | Foote . |
| 5,709,961 | 4/1998 | Cisar et al. ............................... 429/32 |

FOREIGN PATENT DOCUMENTS

| | | |
|---|---|---|
| 54-35995 | 3/1979 | Japan ....................................... 244/97 |
| 1740250-A1 | 6/1992 | Russian Federation ................. 244/96 |

*Primary Examiner*—Charles T. Jordan
*Assistant Examiner*—Patricia Zuniga
*Attorney, Agent, or Firm*—Oblon, Spivak, McClelland, Maier & Neustadt, P.C.

[57] ABSTRACT

A neutral buoyancy fuel bladder uses hydrogen and oxygen to power an airship. The neutral buoyancy fuel bladder includes a fuel cell, electrolyzer, and means for storing hydrogen, oxygen and water. The fuel cell uses the hydrogen and oxygen to create heat, water and current flow. An energy source transmits a beam to an energy receiving unit on the airship, and the energy from said beam is used to (1) power said airship, and (2) replenish the supply of hydrogen and oxygen.

14 Claims, 2 Drawing Sheets

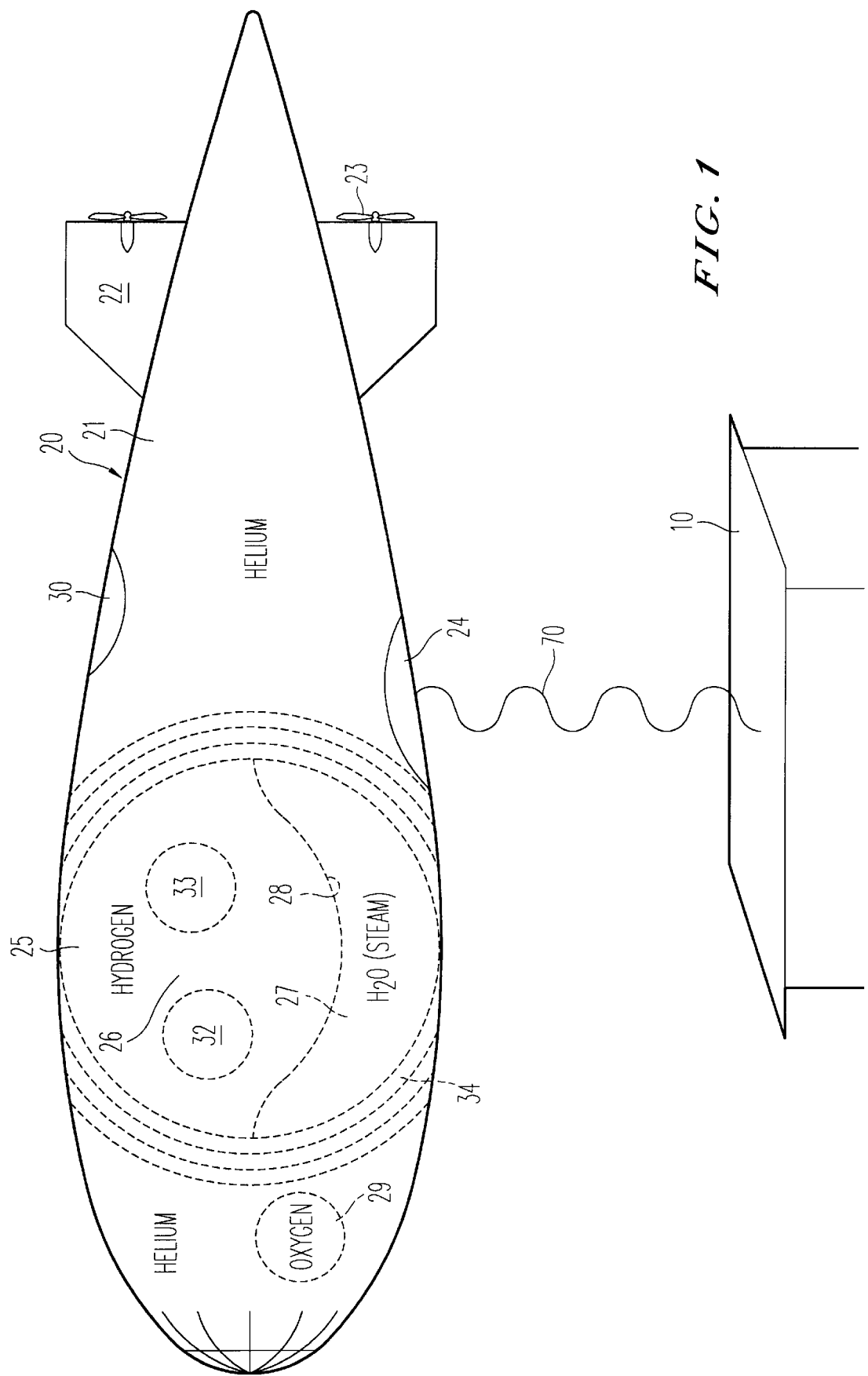

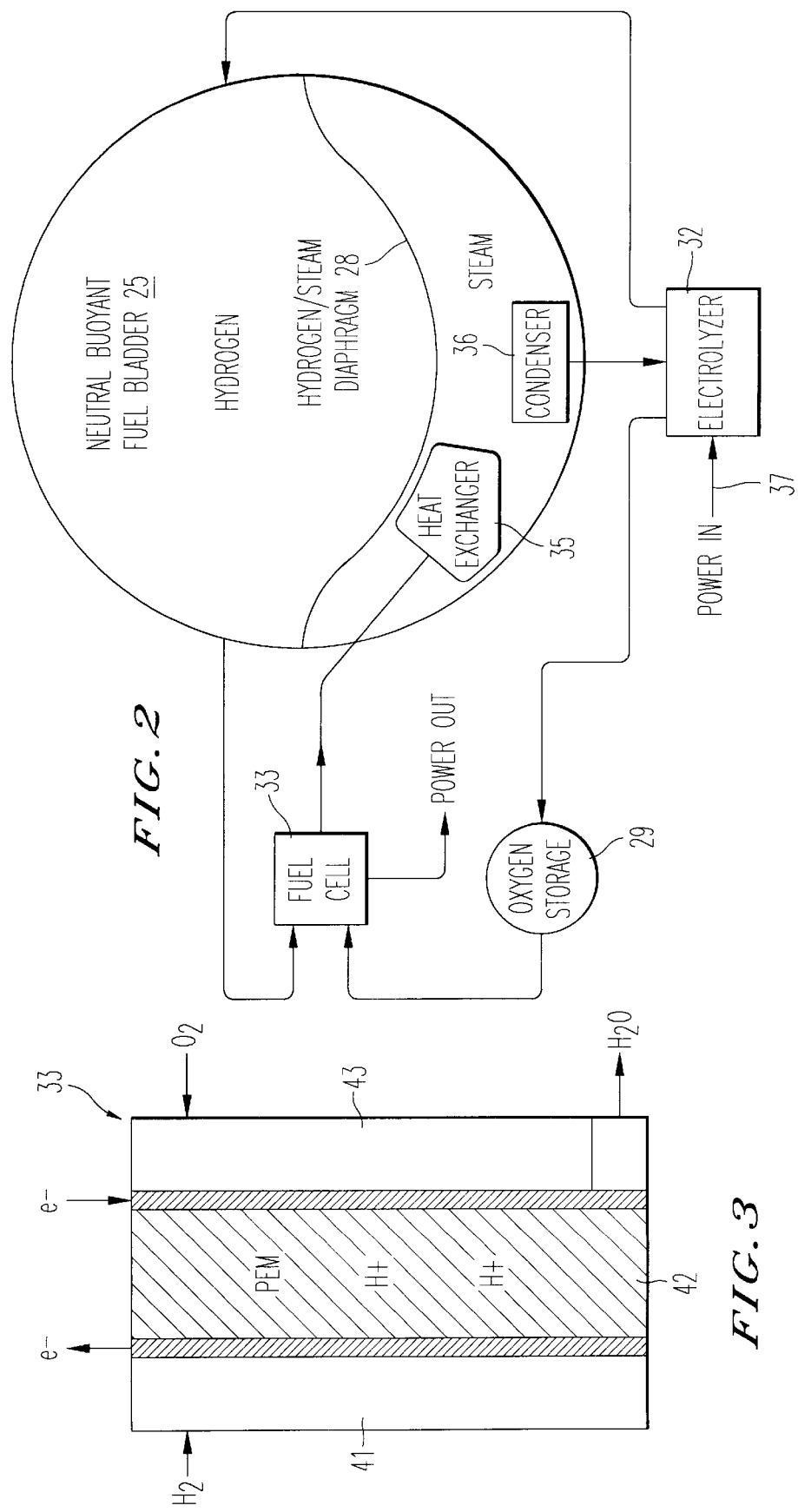

AIRSHIP WITH NEUTRAL BUOYANCY FUEL BLADDER

FIELD OF THE INVENTION

The present invention relates to power systems for airships, and in particular, power systems that allow airships to remain aloft for indefinite periods of time.

BACKGROUND OF THE INVENTION

A typical airship is comprised of a hull which can be either non-rigid, semi-rigid, or rigid. A non-rigid airship normally comprises a pressurized, gas tight fabric envelope constructed of several layers of impregnated cloth, and it relies upon internal pressure to enable it to endure compressive or bending loads. A rigid airship comprises a hull normally constructed of metal or wood which is covered with a doped fabric to form the airship's envelope. A rigid airship does not depend on internal pressure for strength and stability. Semi-rigid airships contain the features of both rigid and non-rigid airships.

An airship achieves most of its lift from the lighter-than-air gas contained within its envelope. The two most frequently used gases are hydrogen and helium, although helium is more commonly used because it is readily available, nonflammable and inert. The mobility of an airship comes from its propulsion system which may include an internal combustion engine, a fuel source, and a propeller and rudder system. One of the major advantages of an airship is its ability to remain aloft for extended periods of time without the need for returning to the earth for refueling as is required by conventional aircraft. This ability to remain aloft for extended periods of time results from the fact that an airship's loft is achieved primarily by the helium or hydrogen contained within its envelope, not from any lift resulting from its propulsion system. While an airship has the ability to remain aloft for an extended period of time, such time period is not unlimited, but rather is limited by the airship's fuel capacity.

SUMMARY OF THE INVENTION

The present invention relates to a novel system for generating power to propel an airship and for aiding in the buoyancy of the airship. The novel system employs a neutral buoyancy fuel bladder. When used in conjunction with an energy transmission source which supplies energy to the airship without the airship returning to the earth, the airship can remain aloft for an indefinite period of time. The ability of an airship powered by the neutral buoyancy fuel bladder to remain aloft for an indefinite period of time makes such an airship ideally suited for telecommunications and/or remote surveillance.

An airship upon which a neutral buoyancy fuel bladder may be installed is comprised of a hull or envelope, a standard propulsion system, propellers, and a rudder system as a means of navigation. The main envelope of the hull is filled with helium to supply the bulk of the buoyancy to the airship, although the neutral buoyancy fuel bladder also supplies some buoyancy. The neutral buoyancy fuel bladder comprises a separate compartment within the hull of the airship, and it is divided into two sections by a diaphragm. One section of the neutral buoyancy fuel bladder contains hydrogen, and the other section contains water in the form of steam. The neutral buoyancy fuel bladder is insulated to maintain the water in the form of steam with minimal energy input. The section of the neutral buoyancy fuel bladder which contains the hydrogen may also contain an electrolyzer and a fuel cell. Alternatively, the electrolyzer and fuel cell may be located outside of the neutral buoyancy fuel bladder.

The airship further contains a pressurized oxygen container and an energy receiving unit, such as a rectifying antenna (rectenna), for receiving power from the energy transmission source. The energy receiving unit receives a beam or other laser form from the energy transmission source which is normally located on the surface of the earth. Such a beam may be a polarized beam from a microwave transmitter. Alternatively, the energy receiving unit can be positioned on the airship to receive power from another airship or other extraterrestrial source. The energy receiving unit receives the beam, and uses the energy therefrom for two purposes. First, the beam supplies energy directly to the airship for the propulsion system and for other energy needs. Second, the beam powers the electrolyzer which converts the steam stored in the neutral buoyancy fuel bladder into its component parts of hydrogen and oxygen. The hydrogen is stored in one section of the neutral buoyancy fuel bladder, and the oxygen is stored in the pressurized oxygen storage container.

When the airship is not in range of the energy transmission source, the fuel cell provides power to the airship. The fuel cell uses the hydrogen and oxygen to produce heat, water, and current flow. The water is stored as steam in the neutral buoyancy fuel bladder for later conversion back to hydrogen and oxygen, the heat is used to maintain the water as steam, and the current flow is used to power the airship. The water is kept in the form of steam because it, along with the hydrogen in the other section of the neutral buoyancy fuel bladder, aids in the buoyancy of the airship.

The above-described system permits the airship to use the hydrogen and oxygen as a fuel source and travel to an area which is remote from the energy transmission source. The airship system could also be employed in a geosynchronous orbit over the power beam and could receive power either continuously or intermittently. In either instance, the airship may serve a telecommunication or remote surveillance function. When positioned at a remote site, and the airship's supply of hydrogen and oxygen needs replenishing, the airship travels back to the area of the energy transmission source for "refueling", i.e. receiving power from the energy transmission source and converting the steam into its component parts of hydrogen and oxygen. Multiple airships and energy transmission sources could be used thereby allowing at least one airship to constantly remain aloft over an area remote from the ground station. Such a setup would be particularly beneficial if the airship must remain aloft over an area, such as a densely populated city, where it may not be convenient to place an energy transmission source.

Consequently, it is an object of the present invention to provide an airship with a power system which allows it to remain aloft for an indefinite period of time.

It is another object of the present invention to provide and replenish the power within said airship via an energy transmission source.

It is a further object of the invention to provide said airship with a fuel cell on board to power said airship when it is not within range of said energy transmission source.

It is a still further object of the invention to use said airship for telecommunications, including, but not limited to, data, Internet access, video and voice.

It is another object of the invention to use said airship for remote surveillance, remote reconnaissance, and remote surveying.

BRIEF DESCRIPTION OF THE DRAWINGS

FIG. 1 is an illustration of the neutral buoyancy fuel bladder of the present invention located within an airship.

FIG. 2 is a detailed illustration of the neutral buoyancy fuel bladder of the present invention.

FIG. 3 is a detailed illustration of a fuel cell used in the present invention.

DETAILED DESCRIPTION OF THE PREFERRED EMBODIMENTS

An airship 20 in connection with which the present invention may operate is illustrated in FIG. 1. The airship 20 can be of the non-rigid, semi-rigid, rigid, or heavier-than-air type. It comprises a hull formed by an envelope 21 which serves to contain helium or hydrogen, and further comprises rudders 22, and propellers 23. On the belly of the airship 20 is an energy receiving unit 24, which for the purposes of this detailed description will be a rectifying antenna (rectenna). In lieu of being placed on the belly of the airship, the rectenna 24 can also be located within the confines of airship 20. In another embodiment, a solar panel 30 is located on the top of the airship 20. Within the hull of the airship 20 is a neutral buoyancy fuel bladder 25. The neutral buoyancy fuel bladder 25 comprises a compartment 26 which stores hydrogen, and a compartment 27 which stores steam. Compartment 26 also contains an electrolyzer 32 and a fuel cell 33. In an alternative embodiment, the electrolyzer 32 and the fuel cell 33 are located outside of the neutral buoyancy fuel bladder 25. The neutral buoyancy fuel bladder 25 is surrounded by an insulating layer 34, and compartments 26 and 27 are separated by a diaphragm 28. In a preferred embodiment, insulating layer 34 consists of several layers containing dead air space as the insulating medium. Also contained within the hull is a pressurized oxygen storage container 29.

FIG. 2 illustrates in more detail the relationship between the neutral buoyancy fuel bladder 25, the fuel cell 33, the electrolyzer 32, and the oxygen storage tank 29. FIG. 2 also illustrates a heat exchanger 35 and a condenser 36, both of which are in communication with compartment 27. FIG. 2 further illustrates a power-out line 37.

The helium or hydrogen in the main portion of the envelope 21 provides the bulk of the buoyancy to the airship 20 although the steam in compartment 27 also provides some buoyancy. When the airship 20 is airborne, a beam 70 is transmitted to it from an energy transmission source 10 preferably located on the surface of the earth. One type of energy transmission source that can be used is a microwave transmitter. The beam 70 is received by the rectenna 24. Appropriate levels of energy and frequency ranges for a similar microwave/aircraft system are disclosed in U.S. Pat. No. 5,503,350, which is incorporated herein by reference. The energy from the beam 70 is used for two purposes. First, it is used to directly power the propulsion system of the airship 20. In such a case, power received by the rectenna 24 is supplied directly to an electric motor or other means which is used to drive the propeller 23. The energy received by the rectenna 24 can also be stored for later use, for example in an on-board battery. Second, the energy from the beam 70 is used to convert the steam in compartment 27 into its component parts of hydrogen and oxygen. The resulting hydrogen is stored in compartment 26, and the oxygen is stored in pressurized container 29.

When the airship 20 is not in the range of the energy transmission source 10, the airship 20 is powered by fuel cell 33. FIG. 3 illustrates that the fuel cell 33 consists of three basic parts—the hydrogen-in system 41, the proton exchange membrane 42 (PEM), and the oxygen/water removal system 43. Hydrogen from compartment 26 enters into the hydrogen-in portion 41 of the fuel cell 33. The hydrogen comes into contact with the PEM 42 which performs two functions. It breaks the molecular hydrogen ($H_2$) into atomic hydrogen ($H^+$) and transfers the atomic hydrogen to the oxygen side 43 of the fuel cell 33. Second, the PEM 42 collects the electrons given off from the disassociation of the hydrogen molecule as direct current to power the airship via power-out line 37. In addition to powering the airship 20 with direct current from the fuel cell 33, power can be generated by an on-board thermal engine or from the solar panel 30.

On the oxygen side 43 of the fuel cell 33, the molecular oxygen ($O_2$) comes into contact with the PEM 42 where it takes up four electrons, thereby being converted to atomic oxygen ($2O^{-2}$). The atomic oxygen and hydrogen then react to produce heat and two molecules of water. The reactions are illustrated below in equations (1), (2) and (3).

$$2H_2 \rightarrow 4H^+ + 4e^- \quad (1)$$

$$O_2 + 4e^- \rightarrow 2O^{-2} \quad (2)$$

$$4H^+ + 2O^{-2} \rightarrow 2H_2O \quad (3)$$

The water and heat produced by the above reactions are transported to heat exchanger 35 contained within compartment 27 of the neutral buoyancy fuel bladder 25. The heat exchanger operates at 180° F. and 45 psia. The steam side of the heat exchanger 35 operates at 100° F. and 0.65 psia. The temperature difference between the heat exchanger 35 and the steam drives the transfer of heat from the heat exchanger 35 to the steam.

The waste water from the fuel cell is at 180° F. and 45 psia. When the waste water is injected onto the outside of the heat exchanger a fraction of the water flash evaporates to produce saturated steam at 0.65 psia and 90° F. (the boiling point of water at that pressure). The remaining waste water is saturated water at 0.65 psia and 90° F. This water, in contact with the heat exchanger, is evaporated and then heated to 100° F. resulting in all the water becoming steam.

When the airship 20 is within range of energy transmission source 10, the power from the energy transmission source 10 is used to drive the above reactions in the reverse direction to produce $H_2$ and $O_2$. Specifically, the condenser 36 condenses the steam in compartment 27 into water and supplies the water to the electrolyzer 32. The electrolyzer 32 splits a molecule of water into an oxygen atom ($O^{-2}$) and two hydrogen atoms ($2H^+$). The oxygen atom releases two electrons to become a molecule of oxygen ($O_2$), and the two hydrogen atoms each take up an electron to make a hydrogen molecule ($H_2$). The hydrogen is stored in compartment 26, and the oxygen is stored in pressurized oxygen container 29. The hydrogen and oxygen can then be used by the fuel cell 33 to produce power when the airship 20 is not within range of energy transmission source 10. The driving of the above reactions in the reverse direction to produce oxygen and hydrogen is referred to as "charging" the fuel cell 33.

The heat exchanger 35 has three modes of operation depending upon the amount of heat created or consumed. In the steady state balanced operation, all the thermal waste energy is put into the neutral buoyancy fuel bladder 25 to maintain the water as steam and to overcome the heat loss through the wall of the neutral buoyancy fuel bladder 25. If the amount of heat produced is in excess of the heat lost through the wall of the bladder, an external heat exchanger is used to dissipate the excess heat. If the heat loss through the wall of the neutral buoyancy fuel bladder is greater than the waste heat from the fuel cell 33, heat must be added to the system by means of a burner to combust the hydrogen and oxygen thereby producing steam and excess heat. The excess heat is supplied to the neutral buoyancy fuel bladder 25 to maintain the water within it in the form of steam. Heat from solar panel 30 can also be used to maintain the steam in the compartment 27.

The airship 20 with neutral buoyancy fuel bladder 25, because of its ability to "refuel" without returning to the earth, can remain aloft for indefinite periods of time. This feature is especially advantageous if the airship 20 is used for telecommunications or surveillance.

Although particular embodiments of the invention have been described, it will be apparent to those skilled in the art, and it is contemplated, that variations and/or changes in the embodiments illustrated and described herein may be made without departure from the present invention. Accordingly, it is intended that the foregoing is illustrative only, not limiting, and that the true spirit and scope of the present invention will be determined by the appended claims.

We claim:

1. A neutral buoyancy fuel bladder comprising:
   an outer envelope forming said bladder;
   a first compartment within said bladder, said first compartment containing hydrogen;
   a second compartment within said bladder, said second compartment containing water in the form of steam;
   means for storing oxygen;
   a diaphragm within said bladder, said diaphragm separating said first compartment from said second compartment;
   a condenser in communication with said second compartment, said condenser transforming said steam from said second compartment into water;
   an electrolyzer, said electrolyzer receiving said water from said condenser and disassociating said water into hydrogen and oxygen molecules;
   a fuel cell, said fuel cell receiving hydrogen from said first compartment and oxygen from said means for storing oxygen, and said fuel cell producing heat, water and current flow from said hydrogen and said oxygen; and
   a heat exchanger in communication with said second compartment, said heat exchanger disappating heat produced by the hydrogen and oxygen reactions in said fuel cell.

2. The neutral buoyancy fuel bladder according to claim 1, wherein said bladder is insulated.

3. The neutral buoyancy fuel bladder according to claim 2, wherein said insulation layer comprises two or more layers of dead air space.

4. The neutral buoyancy fuel bladder according to claim 1, wherein said hydrogen produced by said electrolyzer is stored in said first compartment.

5. The neutral buoyancy fuel bladder according to claim 1, wherein said oxygen produced by said electrolyzer is stored in said means for storing oxygen.

6. The neutral buoyancy fuel bladder according to claim 1, wherein said heat exchanger further supplies heat to said second compartment thereby maintaining the water in the form of steam in said second compartment.

7. The neutral buoyancy fuel bladder according to claim 1, wherein said means for storing oxygen is a pressurized oxygen container.

8. A system for powering an airship, said system comprising:
   an energy transmission source;
   an energy receiving unit located on said airship; and
   a neutral buoyancy fuel bladder located on said airship, said neutral buoyancy fuel bladder comprising:
      an outer envelope forming said bladder;
      a first compartment within said bladder, said first compartment containing hydrogen;
      a second compartment within said bladder, said second compartment containing water in the form of steam;
      means for storing oxygen;
      a diaphragm within said bladder, said diaphragm separating said first compartment from said second compartment;
      a condenser in communication with said second compartment, said condenser transforming said steam from said second compartment into water;
      an electrolyzer, said electrolyzer receiving said water from said condenser and disassociating said water into hydrogen and oxygen molecules;
      a fuel cell, said fuel cell receiving hydrogen from said first compartment and oxygen from said means for storing oxygen, and said fuel cell producing heat, water and current flow from said hydrogen and said oxygen; and
      a heat exchanger in communication with said second compartment, said heat exchanger dissipating heat produced by the hydrogen and oxygen reactions in said fuel cell.

9. The system for powering an airship of claim 8, wherein said energy transmission source is a microwave transmitter.

10. The system for powering an airship of claim 8, wherein said energy receiving unit is a rectifying antenna.

11. A method to power an airship comprising the steps of:
   transmitting a beam to said airship from an energy transmitting source;
   receiving said beam with an energy receiving unit located on said airship;
   disassociating water contained within a neutral buoyancy fuel bladder on said airship into hydrogen and oxygen molecules;
   storing said hydrogen and oxygen molecules in separate containers on said airship; and
   powering said airship with energy from said energy transmitting source.

12. The method for powering an airship according to claim 11, further comprising the steps of:
   transporting said airship to an area outside the range of said energy transmitting source using said hydrogen and oxygen in a fuel cell on said airship; and
   transporting said airship back to said energy transmitting source to replenish said hydrogen and said oxygen by disassociating water with an electrolyzer.

13. The method to power an airship of claim 11, wherein said energy transmission source is a microwave transmitter.

14. The method to power an airship of claim 11, wherein said energy receiving unit is a rectifying antenna.

* * * * *